United States Patent [19]
Van Linder et al.

[11] 3,882,992
[45] May 13, 1975

[54] GRID FEEDER
[75] Inventors: Ronald C. Van Linder, Watervliet;
Basil R. Van Linder, Kalamazoo, both of Mich.
[73] Assignee: Kalamazoo Manufacturing Company, Kalamazoo, Mich.
[22] Filed: Aug. 9, 1973
[21] Appl. No.: 387,107

[52] U.S. Cl. .................... 198/24; 198/35; 271/10
[51] Int. Cl. ............................................ B65g 47/00
[58] Field of Search .......... 198/35, 24; 271/10, 129; 214/8.5 F

[56] References Cited
UNITED STATES PATENTS
1,839,375  1/1932  Corey .................................. 198/24
2,180,163  11/1939  Milmoe et al. ...................... 198/24

Primary Examiner—Evon C. Blunk
Assistant Examiner—Douglas D. Watts
Attorney, Agent, or Firm—Woodhams, Blanchard and Flynn

[57] ABSTRACT

A grid feeder device for storage battery grids or plates comprises a pivotal lifting member and associated grid stop means and oscillating grid guiding means which, with pickup disks, are interposed between input and output conveyors. The input conveyor consists of a pair of endless flexible conveying elements or chains upon which a plurality of grids are vertically hung. Forward movement of the conveying elements tends to maintain such grids closely packed together and urges the leading or forward several of the grids onto a support edge of the lifting member when the latter is in its lower position and against an abutment thereon. Rearward movement of the conveyor relieves pressure from said forward grids. Means defining a slot on the oscillating member periodically receives the lugs of a grid and moves forwardly for carrying same into the path of a tooth on the rotating pickup disk. The slot structure insures positive control over the grid. As the forwardmost grid is lifted from the support edge of the oscillating member by the rotating pickup disk, the slot defining means urges same firmly against the surface of the pickup disk above the tooth thereon after which it returns rearwardly and downwardly to its original position for receiving the next grid from the input conveyor and lifting member to repeat the above-mentioned cycle of operation. In the meantime, the rotating disk transfers the aforementioned forwardmost grid to the output conveyor as desired.

13 Claims, 8 Drawing Figures

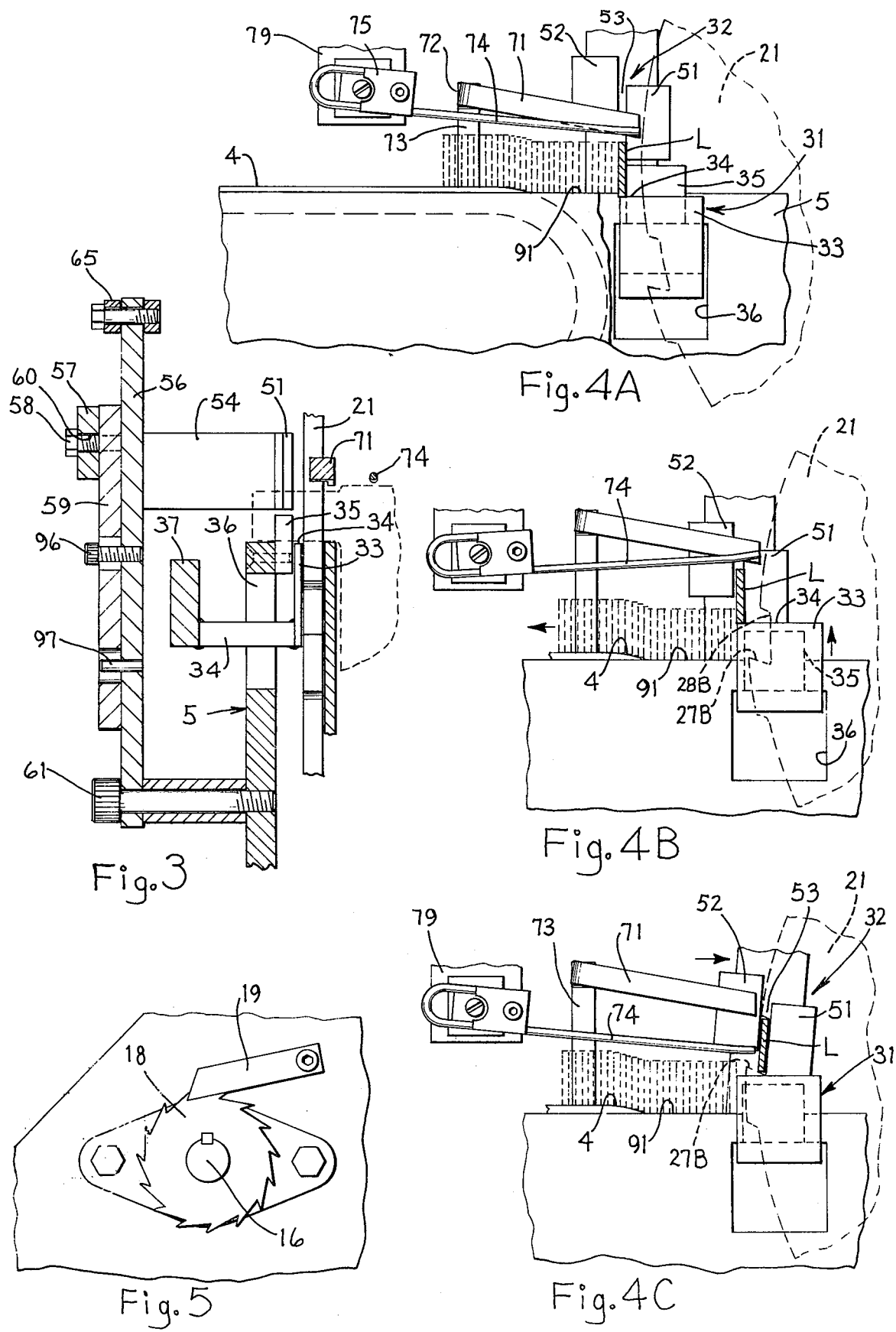

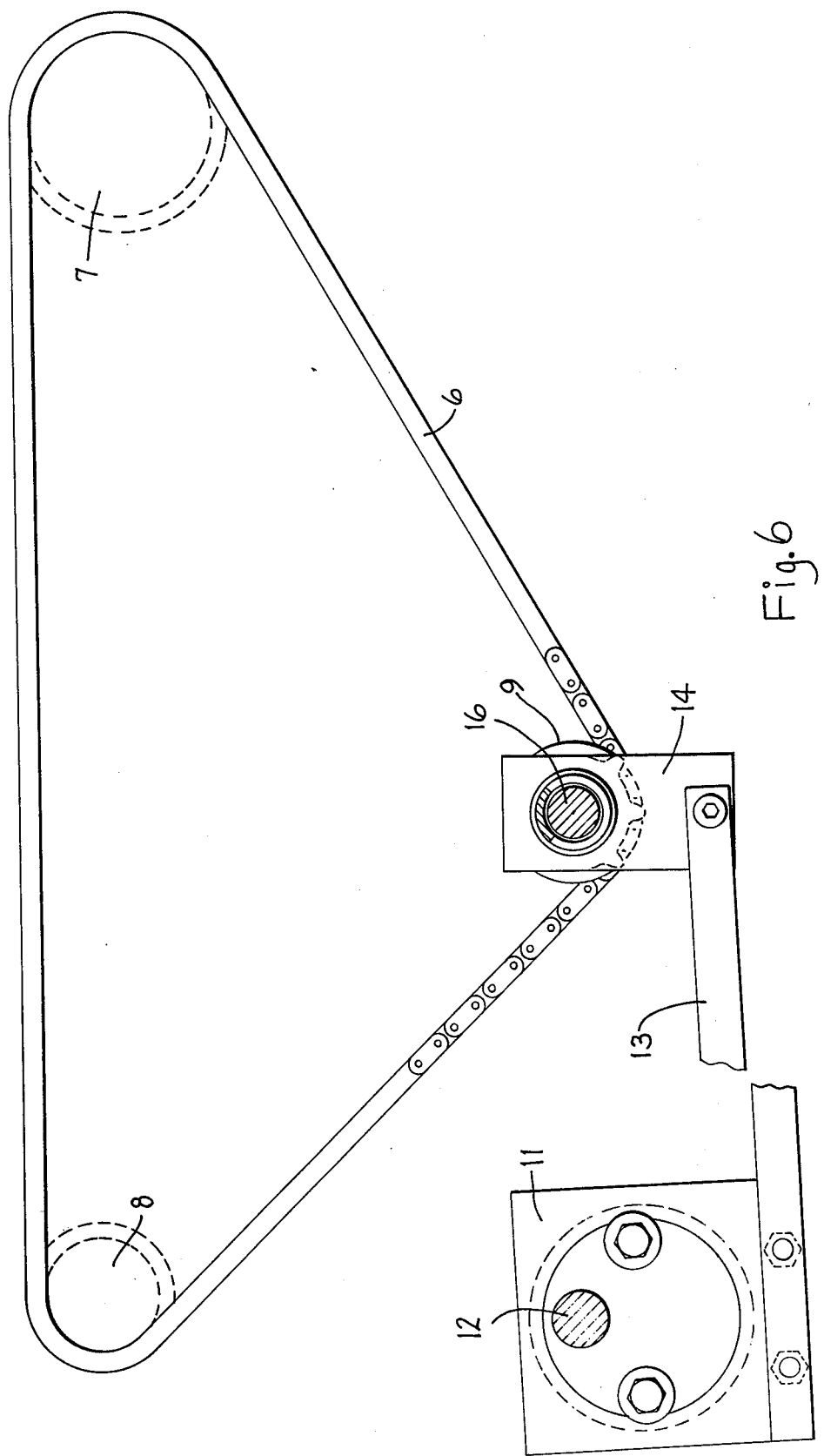

GRID FEEDER

FIELD OF THE INVENTION

This invention relates to a grid feeder and more particularly relates to a grid feeder device having feed control means interposed between an input conveyor and a pickup disk.

BACKGROUND OF THE INVENTION

The present invention arose as a solution to a problem in the handling of grids for storage batteries and more particularly in the feeding thereof through a suitable processing machine, such as a grid pasting machine, and therefore is discussed hereafter in terms thereof. However, it is contemplated that the present invention is applicable to mechanisms for feeding pasted grids or plates to other means, such as brushers and slitters, and is also applicable to feeding of other platelike articles, particularly those having sidewardly extending ears thereon.

Conventionally, grids to be pasted are placed upon a horizontal conveyor belt which moves past a grid pasting station. Because it is necessary to a successful pasting operation that the full surface of one side of the grid be exposed to the pasting station, successive grids must not overlie each other even partially. Also, only minimal, if any, space is permitted between the grids on the belt conveyor lest paste from the pasting station be applied to the face of the belt itself, which is both wasteful of paste and requires frequent shutting down of the machine to clean the belt. Since the belt is normally run continuously at a fixed speed, grids must be placed thereon in an accurately timed sequence to avoid either overlapping of grids or excessive spacing therebetween.

One method of so placing grids on the belt conveyor associated with a pasting machine is to provide one or more rotatable coaxial pickup disks located adjacent the head of the belt conveyor and to provide an input conveyor consisting of a pair of spaced, continuously moving chains associated therewith in a manner that the chains continuously urge a horizontal stack of vertical grids against the peripheries of the disks so that teeth on the disks pick up grids from the stack and place same upon the belt conveyor. However, it has been found that the pickup disks will not reliably pick up one and only one grid at a time from the stack. More particularly, if the teeth on the disks are made large enough to reliably pick up a grid they will often pick up more than one grid at a time which results in an undesired overlapping of grids on the pasting machine conveyor belt. On the other hand if the teeth on the disks are made sufficiently small that they will reliably pick up no more than one grid from the stack, they will ultimately wear and often fail to pick up any grid, which results in a relatively large open space on the belt between a pair of successive grids.

In response to such problems we have already developed the machines disclosed and claimed in our applications Ser. No. 125,622 (now U.S. Pat. No. 3,743,114) and Ser. No. 255,755 assigned to the same assignee as the present application. However, in a continuing effort to provide a machine for the purposes above outlined and having maximum accuracy and reliability, we have now developed in accordance with the present invention the further transfer device hereinafter described in detail. Same assures an even more reliable than previously transfer of one grid at a time from the input chain conveyor to the toothed pickup disk set and thus insures that grids will be placed upon the output belt conveyor in proper close spaced relationship and without overlapping.

Accordingly, the objects of this invention include provision of:

1. A grid feeder device, as aforesaid, which will place articles on a continuously moving output conveyor with a predetermined regular spacing and no overlapping.

2. A grid feeder device which assures that articles such as grids for storage batteries will be placed one at a time in a continuous evenly timed sequence on an output member.

3. A grid feeder device, as aforesaid, in which transfer means are provided capable of reliably transferring one and only one article at a time from a close spaced or compressed stack thereof to rotating toothed pickup disks.

4. A grid feeder device, as aforesaid, in which the transfer means will reliably transfer articles one at a time from a stack thereof to toothed pickup disks and will not cause such articles to stick together in groups of two or more.

5. A grid feeder device, as aforesaid, which is particularly adapted to feeding of battery grids to a grid pasting machine but which is also readily adaptable to handling of other articles of a more or less similar nature for feeding same to a desired location.

6. A grid feeder device, as aforesaid, in which the transfer means includes an oscillating member interposed between the input conveyor and toothed rotating disks which oscillates in synchronism with rotation of the disks and also includes guide means for assisting in assuring transfer of one and only one article at a time.

7. A grid feeder device, as aforesaid, which is adaptable to transferring articles reliably in fixed-size groups other than one and which, for example, may be adapted to transfer articles reliably two at a time, three at a time, etc., if desired.

8. A grid feeder device, as aforesaid, which is of simple and reliable construction, is capable of economical manufacture and of reliable service for long periods of time and which is readily serviceable.

Other objects and purposes of this invention will be apparent to persons acquainted with apparatus of this general type upon reading the following specification and inspecting the accompanying drawings.

BRIEF DESCRIPTION OF THE DRAWINGS

FIG. 3 is an enlarged, fragmentary, cross-sectional view substantially taken along the line III—III of FIG. 2.

FIG. 4A is a sectional view on line IV—IV of FIG. 2 and showing the oscillating member in its lower rearward position.

FIG. 4B is a section similar to FIG. 4A but showing the feeder in a raised but rearward position.

FIG. 4C is a section similar to FIG. 4A but showing the feeder in a raised and forward position.

FIG. 5 is a fragmentary view substantially taken along the line V—V of FIG. 2.

FIG. 6 is a fragmentary sectional view substantially taken along the line VI—VI of FIG. 2.

Figure 1:
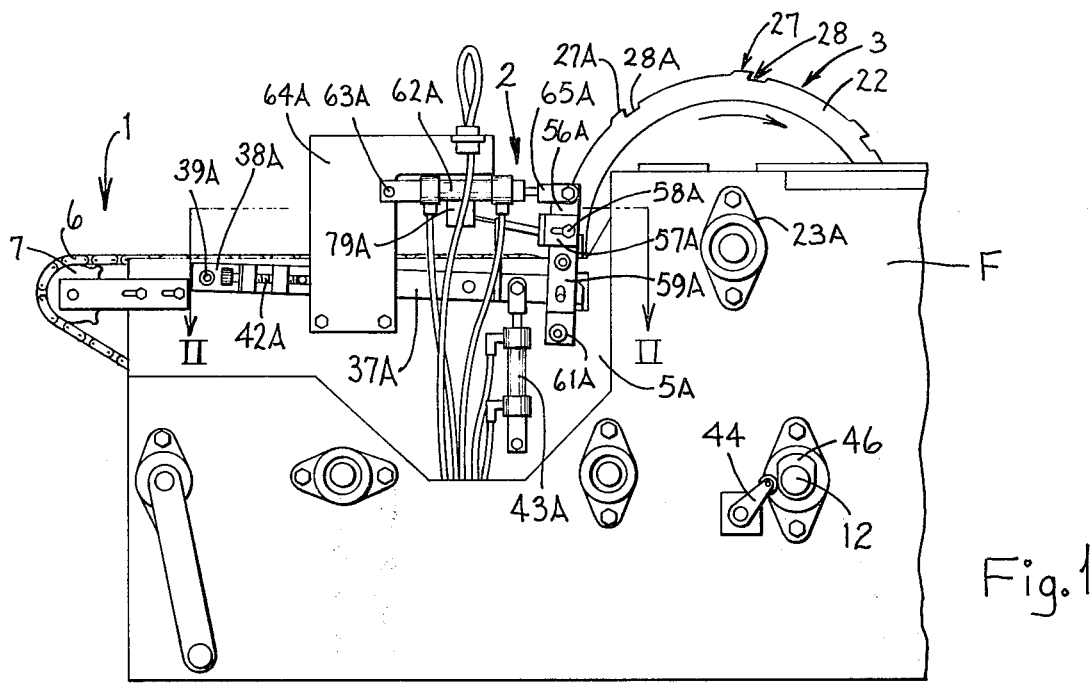
FIG. 1 is a fragmentary, side elevational, view of the grid feeder device of the present invention.

Certain terminology will be used in the following description for convenience in reference only and will not be limiting. The words "up", "down", "right" and "left" will designate directions in the drawings to which reference is made. The words "forwardly" and "rearwardly" will refer to the direction of material flow through the device, forwardly being the normal flow direction. The words "in" and "out" will refer to directions toward and away from, respectively, the geometric center of the device and designated parts thereof. Such terminology will include derivatives and words of similar import.

SUMMARY OF THE INVENTION

The objects and purposes of the invention are met by providing a grid feeder device for storage battery grids or plates comprising coordinated lift and pivotally oscillating guide means which, with pickup disks, are interposed between input and output conveyors. The input conveyor consists of a pair of continuously orbiting endless flexible conveying elements or chains upon which a plurality of grids are vertically hung, the feeding, normally intermittent, movement of the conveying elements tending to maintain such grids closely packed together and for urging the leading or forward several of the grids toward lift means when said latter is in its lower position and against an abutment thereon. The support edge of the lift means periodically moves upwardly carrying a single grid upwardly and into guide means. The guide means then positively moves the grid forwardly against the surface of the pickup disk above the tooth thereon. The grid is lifted out of the guide means by such tooth and is now fully transferred.

DETAILED DESCRIPTION

The feeding device (FIG. 1) embodying the invention may be considered to consist of three structurally and functionally interconnected sections, a leftward or input section 1, a selecting and guiding section 2 and wheel section 3. Excepting as set forth in detail below, the general organization of both the input section 1 and the wheel section 3 are already known and our copending applications Ser. Nos. 125,622 and 255,755, both assigned to the same Assignee as the present application describes advantageous forms of this type. The design of said sections 1 and 3 used herein is generally similar and variations therefrom will be fully described hereinafter.

However, and for purposes of convenient reference herein, a brief description thereof follows. Said input section 1 comprises a pair of chains 4 and 6 which are arranged parallel with respect to each other, extend over a pair of guiding sprockets 7 and 8 (FIG. 6) and over a driving sprocket 9. Any convenient mechanical means are provided for driving the sprocket 9 in such a manner as to provide intermittent forward motion of the chains together with a slight backward movement between each of the forward movements. One simple means utilized in the present embodiment comprises an eccentric 11 mounted on and driven by a main drive shaft 12 (FIGS. 1 and 6) which acts through a connecting rod 13 and a depending lever 14 onto the shaft 16, which latter is between and connecting the sprockets 9 of each of the chains 4 and 6. A friction clutch 17 connects the lever 14 with the shaft 16 and an arrangement comprising a ratchet 18 and pawl 19 (FIGS. 2 and 5) permit unlimited rotation of the shaft 16 in one direction and only limited rotation thereof in the opposite direction. Thus, reciprocation of the connecting rod 13 in one direction will act through the friction clutch 17 to rotate the shaft 16 a distance of two or more teeth on the sprocket 18 but reciprocation of the connecting rod 13 in the opposite direction will effect reverse movement of the shaft 16 through a distance not greater than the length of one tooth of said sprocket and the chains are correspondingly advanced and reversed.

The wheel section 3 comprises a pair of disks 21 and 22 which are mounted for suitable rotation on the frame of the machine through suitable bearings of which one appears at 23. Said disks are preferably connected by a shaft 24 (FIG. 2) which is driven from a source which is interlocked with the driving of the shaft 16 by any suitable means, such as a chain drive schematically indicated at 26 and connected to the main shaft 12. Said disks are provided with circumferentially spaced teeth collectively designated by the numeral 27, and each of said teeth are preferably accompanied by notches collectively designated by the numeral 28, on the rotationally leading side of each thereof, the direction of rotation being indicated by the arrow in FIG. 1.

Thus, a series of battery plate grids supported by their laterally extending lugs on the chains 4 and 6 in a conventional manner are fed, and relayed one at a time, to the wheels 21 and 22. Said laterally extending lugs are received onto successive pairs of teeth 27 and further received into the notches 28 for insuring reliable retention of said plates on and by said wheels 21 and 22. Rotation of said wheels in an already known manner will lift said plates one at a time upwardly and rightwardly as appearing in FIG. 1, and deposit same as desired onto further means, not shown, by which said plates are then carried rightwardly as appearing in FIG. 1 from the machine here shown. As above mentioned, such further means may be a pasting machine onto which the plates should be laid in flat, successive, closely spaced relationship or other conveyor or processing means as desired. Such transfer means are already well known and are further detailed in the above-mentioned applications.

The basic frame of the machine comprises a pair of parallel upstanding plates F fixed and supported by a suitable base, not shown, with the above-mentioned feed chains 4 and 6 together with the parts comprising the selecting and guiding section 2 and the wheel section 3 are all arranged on the separate mounting plates 5 and 5A. Said plates 5 and 5A and the components mounted thereon are arranged by any convenient conventional means, not here shown but which are well known to those skilled in the art, for adjustment toward and away from each other to accommodate the mechanism to panels such as battery plates of varying transverse width. All of this is well known, forms no part of the present invention and hence in the interest of simplifying the present disclosure has been omitted.

Turning now to the present invention, there is provided lifting means 31 (FIGS. 2, 3 and 4A) and guide means 32 which are constructed and related to each other and the rest of the apparatus as hereinafter set forth in detail. This lifting and guide mechanism is duplicated on both sides of the machine and hence the parts on the rightward (looking in the direction of travel of the plates) side of the machine will be indicated by the same numbers as those on the leftward side of the machine with the further designation "A" associated therewith and it will be understood that the description below given for the lifting and guiding mechanism on the leftward side of the machine will apply also to that on the rightward side.

Referring first to the lifting means 31 there is provided a vertically slidable plate 33 having an upper lifting edge 34 at the upper end thereof. Said lifting plate is positioned immediately inwardly of the side plate 5 of the frame F of the machine and is mounted on a cross plate 34' (FIGS. 2 and 3) which extends through an opening 36 in the side plate 5 of the machine. Said opening 36 is of sufficient vertical extent as to permit the desired vertical movement of the plate 33. The cross plate 34' is then fixed to the rightward end of the lift lever 37 which is fixed on and for longitudinal adjustment with a lift mounting lever 38. Said latter is then pivoted at 39 to the side plate 5. Any convenient means, such as a bolt 41 related to slot means, not shown, are provided for connecting the levers 37 and 38 for longitudinal adjustment with respect to each other and conventional threaded means 42 acting through appropriate abutments on said levers are provided for effecting the desired longitudinal adjustment. The importance of effecting the precise adjustment of the longitudinal position of the lift plate 33 will appear further hereinafter. A lift cylinder (43A in FIG. 1) is provided for lifting the lever 37 and the operation of same is timed in any conventional manner in positive relationship to the operation of the rest of the apparatus by any conventional means, such as a cam follower 44 acting on a cam 46 connected to the main shaft 12. Other means, such as electrical, may, of course, be provided if desired for interrelating the operation and sequencing of the apparatus.

A small plate 35 is rigidly fixed to the upper portion of the side plate 5 (FIGS. 3 and 4A) and functions as a limit stop for the panels being fed to the lifting means. The spacing of the rearwardmost (leftward as appearing in FIG. 4A) edge of the stop 35 from the rearward edge of the lifting member 33 is in this embodiment slightly less than the thickness of the panel to be lifted to insure that one, but only one, such panel is lifted upon operation of the lifting device.

Turning now to the guide means 32, there is provided a pair of guide plates 51 and 52 which are longitudinally spaced from each other to define a slot 53. As best seen in FIG. 4A, this slot at the commencement of an operating cycle is located directly above the rearward portion of the lifting edge 34 of the lift plate 33. The importance of this will be developed hereinafter. Further, it will be observed upon reference to FIG. 4A that the guide plate 51 is positioned at both its upper and lower ends below the corresponding portions of guide plate 52.

Figure 2:
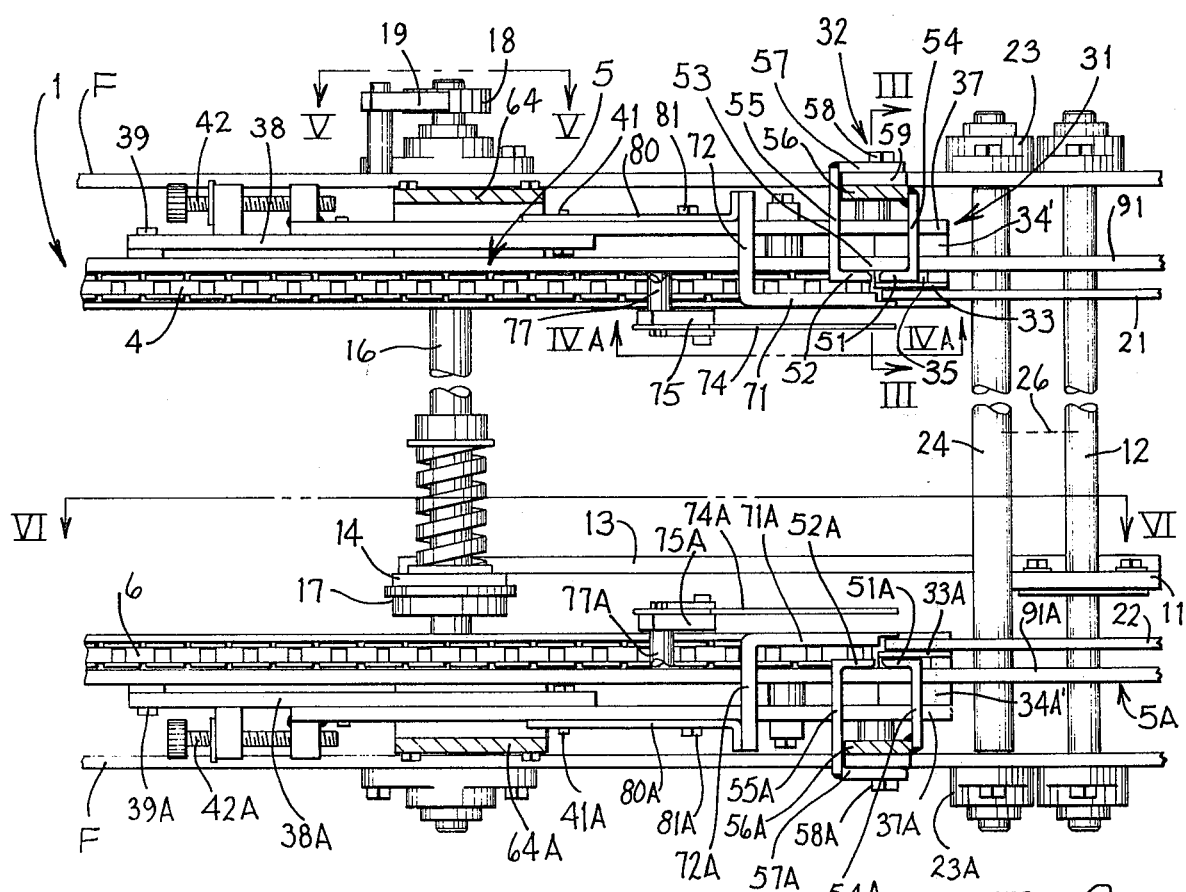
FIG. 2 is a sectional view taken on the line II—II of FIG. 1.

Continuing an examination of the guide plates 51 and 52, it will be seen upon reference to FIG. 2 that these guide plates are connected, as by welding, to connecting plates 54 and 55. The connecting plate 54 is in turn connected, as by welding, to the vertical guide lever 56 which is pivotally affixed at 61 to the side plate 5 and is arranged for reciprocation of its upper end by any suitable feed means such as the air actuated feed cylinder 62 acting through the connector 65. Lying closely adjacent the lever 56 is a connector plate 59, same being fastened to the lever 56 by a cap screw 96 and a guide pin 97. The cap screw 96 is in this embodiment screwed into the lever 56 but is provided with a slot in the plate 59 to permit forwardly and rearwardly adjustment of said plate 59 with respect to the lever 56 and also is provided with some vertical clearance to permit vertical adjustment of said parts with respect to each other. The connector plate 55 extends past both the lever 56 and plate 59 to a slotted mounting plate 57 which is mounted by a cap screw 58 firmly but adjustably onto the plate 59. Adjustment of the plate 57 in the slot 60 effects adjustment of the width of the slot 53.

Turning now to the feed cylinders of which one is shown at 62A in FIG. 1, same are pivotally mounted to upstanding plates 64 and 64A which are in turn mounted on the side frame plates 5. The actuation of said feed cylinders is by any convenient means which will positively interrelate same to the actuation of the rest of the apparatus, such as by cam and follower means similar to that above described for the lift cylinders (43A in FIG. 1).

Thus, looking at FIG. 4A it will be appreciated that the lift plate 33 will move in a straight line upwardly and downwardly while guide plates 51 and 52, remaining in a fixed relationship to each other as shown, will move substantially rightwardly from the position shown in FIG. 4A and return thereto.

While the foregoing-described apparatus is sufficient for accomplishing the basic operation of the machine, further parts are provided for improving the control exercised by the machine over the panels being fed and hence same will now be described in the interest of a complete understanding of all aspects of the invention and continuing the assumption that the panels being so fed are those for which this embodiment of the machine is primarily designed, namely, battery plate grids.

An arm 71 whose function and purpose will be described more fully hereinafter is positioned immediately inside of the guide plates 51 and 52 and extends as best shown in FIG. 2 somewhat past the periphery of the wheel 21. Same is rigidly fixed through an angle 72 to a lift rod 73 (FIG. 4A) which in turn is mounted on the lift lever 37 by means of an adjustable member 80, whereby the guide 71 will move upwardly and downwardly in synchronism with the lever 37 and hence the lift plate 33. The member 80 is fastened by any convenient means, such as a bolt 81 acting through an appropriate slot, for longitudinal adjustment of said member 80 and consequently the arm 71 forwardly or rearwardly as required for optimum operation.

Positioned above the lifting plates 33 and 33A are a pair of pivotally supported fingers 74 and 74A which fingers are extensions of the operating arms of microswitches 75 and 75A. Said microswitches are mounted on the rods 77 and 77A which are in turn mounted on the frame of the machine in any convenient manner, such as by being mounted through plates 79 and 79A (FIGS. 1 and 4) onto the supports 64 and 64A.

Said microswitches 75 and 75A are connected in series to control means for actuating the supply of operating fluid to the feed cylinder 62A and its counterpart, not shown, on the other side of the machine. Thus, as will be set forth in more detail below, raising of panel members evenly so as to actuate both fingers 74 and 74A simultaneously will energize the cylinder 62A and its counterpart on the other side of the machine for moving forwardly the guide mechanisms 32. However, if there is a malfunction and for some reason only one side of the panel member is lifted, then only one of the fingers will be actuated and the guide means 32 will not be moved. In such case, when the lifting means drops down in its regular cycle, the arms 72 and 72A will move downwardly with the downward movement of the lifting means and will pull the partially lifted panel member back to its downward position, ready for a repeat of the operating cycle.

OPERATION

While the operation of the above-described machine has been somewhat indicated above, it will be reviewed briefly hereinafter to insure a complete understanding of the invention.

Continuing the use of battery plate grids as one specific example of the operating capabilities of the machine, it will be assumed that a series of such plates are suspended by their laterally projecting lugs from the chains 4 and 6 and are advanced in a stepwise manner forwardly by operation of the chain as above described. As such chains move the grids forwardly, they are pushed off the end of the chain and are supported on the upper edges 91 and 91A (FIGS. 2 and 4A) of the side plates 5 and 5A. The forward movement of said chains will move a quantity of grids forwardly and tightly against the stops 35 and 35A and reverse movement of said chains will relieve the pressure on said grids so that the forwardmost thereof can be easily lifted as hereinafter described without any tendency for dragging others of said grids therewith.

Immediately following such reverse movement, the pawl 44 is operated by the cam 46 to energize the cylinder 43A (and its counterpart on the other side of the machine) which moves the levers 37 and 37A upwardly and thereby moves the lifting plates 33 and 33A upwardly. These bear against the respective lugs of the battery plates, one being indicated at L in FIG. 4A and move same upwardly to the position shown in FIG. 4B. This action lifts the lugs above the upper edge of the limit stop 35, and its counterpart on the other side of the machine, and also lifts the triggers 74 and 74A. Assuming that the plate is properly and uniformly lifted, both of the triggers 74 and 74A are actuated, resulting in actuation of both of the microswitches 75 and 75A and energization of the cylinder 62 and its counterpart on the other side of the machine. It will also be observed by reference to FIG. 4B that when the lugs L are moved upwardly as above described, they are moved into the slot 53 between the guide plates 51 and 52. Said slot is only slightly wider than the thickness of said lugs and the guide plate 52 will be carefully adjusted as above described to select the proper width for said slot.

With the actuation of the cylinder 62A and its counterpart on the other side of the machine, said guide plates move forwardly (rightwardly as appearing in FIGS. 4A, 4B and 4C) to move said lugs into the path of the next available tooth, namely, the tooth 27B appearing in FIG. 4B. It is evident that it is important to time the actuation of both the lifting mechanism 31 and the guiding mechanism 32 with the position of the teeth on the wheels 21 and 22 so that the lugs L will be moved toward said wheels at an appropriate point ahead of one of said teeth.

Looking now at FIG. 4C, it will be seen that the guide mechanism has moved forward to such a distance that the lug L is seated well onto the teeth 27B and also into the adjacent one of the recesses 28. Simultaneously because of the pivotal mounting of the lever 56, on which the guide mechanism 32 is mounted, the direction of the slot 53 has tilted enough that it is virtually parallel with the direction of movement of the teeth so that the lug L will in response to the lifting movement of the teeth merely slide upwardly out of said slot 53. Movement of said lugs beyond the end of the fingers 74 and 74A will after a sufficient time delay which may be provided electrically to enable the lug L to move out of the slot 53 then reverse the activation of the cylinder 62 and its counterpart on the other side of the machine to effect a return of both the guide mechanism 32 and the lifting mechanism 31 to the position of FIG. 4A for the commencement of a new cycle.

In the event that the mechanism malfunctions so that more than one plate is lifted by the lifting means 33 and 33A, the second plate will merely strike the bottom of the guide plate 52 and 52A and will not be moved by the guide means toward the wheels. Thus, when the mechanical timing mechanism effects a return of the lifting plate 33 to its FIG. 4A position the arms 71 and 71A will move downwardly, return to the lowermost position any such plate but will not affect the plate which has been moved as in FIG. 4C into the teeth of the wheel. Likewise, if only one side of the plate is lifted so that only one microswitch is activated and hence the advancing cylinder 62 and its counterpart on the other side of the machine are not activated, the further mechanical operation will again effect a return of the lifting means and the arm 74 to the FIG. 4A position and thereby cause the arm 74 and/or the arm 74A to drive such partially lifted plate back to its starting position and the cycle can commence again. Thus, the likelihood of a malfunction causing a jamming of the machine is minimized and the machine is provided with the capability for clearing the most probable consequences of any such malfunction.

While a specific embodiment of the invention has been set forth above as an illustrative example, it will be recognized that numerous variations may be made therein and said variations will be included within the hereinafter appended claims excepting as said claims may expressly provide otherwise.

The embodiments of the invention in which an exclusive property or privilege is claimed are defined as follows:

1. Transfer mechanism for effecting transfer of panels from a position of vertical alignment onto the upwardly moving teeth of continuously rotating toothed transfer wheels, comprising in combination:
   conveyor means for supporting said panels in vertical parallel alignment and drive means coupled to said conveyor means for advancing said panels forwardly toward said wheels;
   fixed stop means for limiting said forward advancement at a fixed point adjacent said wheels but radially beyond the periphery of the teeth thereof;
   lifting means for lifting a predetermined number of said panels upwardly to a level above the top of said stop means and having a lifting edge sidewardly offset from and extending chordally inward of said wheel to overlap the path of the roots of said upwardly moving teeth;
   guide means including an upstanding slot for (1) forwarding said panels when in such lifted position along said lifting edge directly into the path of the roots of said upwardly moving teeth, and for (2) positively guiding said panels in said root path while upwardly moving teeth lift said panels from said lifting means.

2. The device of claim 1 wherein said slot in said guide means is a vertically and laterally opening slot into which at least a portion of said panels are moved by said upwardly moving lifting means for thereby snugly and closely controlling said portion of said panels as said guide means moves forwardly into the path of said upwardly moving tooth and from which said tooth can move said portion of said panel by merely further upward movement through and out from said slot.

3. The device of claim 1 wherein said lifting means comprises a pair of plates on opposite sides of said machine and adjacent to but projecting in overlapping relation rearwardly from the rearward surface of said stop means a distance sufficient but not greater than that required to pick up the desired number of said panels and operating means timed with respect to the rotative position of said teeth and operating said lifting means for lifting said plates in appropriately timed relationship to the rotative position of said teeth.

4. The device of claim 1 in which said lifting means includes a lifting plate incorporating said lifting edge, an elongate substantially horizontal lever having a free end connected to said lifting plate and a pivoted end pivoted at a point remote therefrom, with means for adjusting the horizontal spacing of said lifting plate from the pivot axis, and timeably operable means acting on said lever for effecting lifting thereof and consequently lifting of said lifting plate.

5. The device defined in claim 1 including feed means for moving said guide means forwardly for delivery of a panel to said wheels, a pair of fingers positioned adjacent each side of said panel, and switch means responsive to said fingers and electrically connected in series with each other for actuating said feed means;
whereby a panel must move upwardly with sufficient uniformity to actuate both of said switches in order to initiate said forward movement by said guide means.

6. The device defined in claim 1 including also an arm positioned above said panels and means vertically moving said arm with the vertical movement of said lifting means for causing, if a panel is lifted but fails to feed forwardly, downward movement of said lifting means to effect simultaneous downward movement of said arm and return of said panel into its lowermost position in readiness for the commencement of another cycle of operation.

7. The device of claim 1 in which said predetermined number is one.

8. The device of claim 1 in which said conveyor means includes endless panel support means for urging the panels against said stop means by advancing movement but reversible for relieving the pressure of said panels on the forwardmost ones thereof, said drive means including clutch means engaging said endless means and actuable for advancing the latter a first increment and then reversing same only a lesser increment.

9. The device of claim 1 in which said guide means comprises forwardly shiftable front and rear guide members continuously spaced by said upstanding slot, said slot being of width to receive no more than the desired panel thickness therein, said rear guide member having a rearward position closely overlying and blocking lifting of those panels on said conveyor means which rearwardly abut the width of panels to be lifted, the rear edges of said stop means and lifting means being spaced slightly less than but being substantially coplanar with the slot defining edges of the rearwardly positioned front and rear guide members respectively, whereby said lifting means smoothly raises the desired thickness of panels from said conveyor along and past said stop and into said slot for forwarding by said guide means.

10. Transfer mechanism for effecting transfer of panels from a position of vertical alignment onto the upwardly moving teeth of rotating toothed transfer wheels, comprising in combination:
conveyor means for supporting said panels in vertical parallel alignment and drive means for said conveyor for advancing said panels forwardly toward said wheels;
stop means limiting said forward advancement at a point adjacent said wheels but radially beyond the periphery of the teeth thereof;
lifting means adapted to lift a predetermined number of said panels upwardly to a level above the top of said stop means;
guide means arranged for advancing said panels when in such lifted position across the top of said stop means and onto said upwardly moving teeth, said guide means being arranged for permitting said panels to move further upwardly for disengagement from said guide means in response to continuing upward movement of said teeth, said guide means including a pair of forwardly and rearwardly positioned guide plates spaced from each other to provide a slot therebetween, the forward limit of said slot being aligned with the rearward edge of said stop means when said guide means is in its rearwardmost position;
a substantially vertically positioned lever supporting said guide means at the upper end thereof and being pivotally mounted at the lower end thereof whereby pivotal movement of said lever will move said guide means toward and away from the periphery of said wheel;
means operative in synchronism with the attainment by said lifting means of said level above said stop means for effecting forward movement of said guide means.

11. The device defined in claim 10 wherein the point of pivoting of said lever is so related to a tangent of said wheel that said slot when in a position for delivering a panel onto one of said teeth will be aligned substantially parallel to the path of travel of said teeth whereby said panel may move on through said slot and out therefrom;
whereby the panel is freed from said guide means and said guide means may then return to its point of beginning.

12. Transfer mechanism for effecting transfer of panels from a position of vertical alignment onto the upwardly moving teeth of rotating toothed transfer wheels, comprising in combination:
conveyor means for supporting said panels in vertical parallel alignment and drive means coupled to said conveyor for advancing said panels forwardly toward said wheels;

stop means for limiting said forward advancement at a point adjacent said wheels but radially beyond the periphery of the teeth thereof;

lifting means for lifting a predetermined number of said panels upwardly to a level above the top of said stop means;

guide means for forwarding said lifted panels from said lifting means onto said upwardly moving teeth and disengageable from said panels by continuing upward movement of said teeth;

control means responsive to failure of said lifting means to lift both lateral ends of said panels above said stop means for preventing forwarding of said guide means; and arm means vertically movable in synchronism with said lifting means for positively returning incompletely lifted panels downwardly with the downwardly returning lifting means;

whereby to prevent jamming of the mechanism by panels incompletely lifted or cocked during lifting and to enable a repeat of the operating cycle with said panels.

13. The device of claim 12 in which said control means includes a pair of fingers resting atop corresponding end portions of plates being lifted by said lifting means, said fingers being rearwardly offset from the wheels for disengagement from plates forwarded into the tooth path, and switch means for (1) forwarding of said guide means only upon a predetermined lifting of both said fingers and for (2) returning said guide means rearwardly and lifting means downwardly after a delay sufficient for said teeth to clear said panels from both thereof.

* * * * *